United States Patent
Burgess et al.

(10) Patent No.: US 7,601,237 B2
(45) Date of Patent: Oct. 13, 2009

(54) FABRIC HANDLING APPARATUS AND METHOD FOR COMPOSITE MANUFACTURE

(75) Inventors: Roger A. Burgess, Long Beach, CA (US); Robert Pickell, Long Beach, CA (US); Toni K Brown, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 257 days.

(21) Appl. No.: 11/307,321

(22) Filed: Feb. 1, 2006

(65) Prior Publication Data

US 2007/0187026 A1    Aug. 16, 2007

(51) Int. Cl.
B32B 37/00 (2006.01)
B65H 81/00 (2006.01)
(52) U.S. Cl. .................. 156/265; 156/230; 156/250
(58) Field of Classification Search .......... 156/230, 156/250, 265
See application file for complete search history.

(56) References Cited

U.S. PATENT DOCUMENTS

| | | | |
|---|---|---|---|
| 4,541,886 A | * | 9/1985 | Marlow et al. ............. 156/230 |
| 4,545,544 A | | 10/1985 | Rockerath et al. |
| 4,679,291 A | * | 7/1987 | Schmeal et al. ............. 156/92 |
| 5,505,994 A | | 4/1996 | Crawford |
| 5,848,458 A | * | 12/1998 | Bullen ..................... 29/33 K |
| 5,920,974 A | * | 7/1999 | Bullen ..................... 29/33 K |
| 6,446,955 B1 | * | 9/2002 | Janatka et al. .............. 271/96 |

* cited by examiner

*Primary Examiner*—Jeff H Aftergut
(74) *Attorney, Agent, or Firm*—Yee & Associates, P.C.; James M. Poole (57) ABSTRACT

An apparatus and accompanying method for handling fabrics used in the construction of composite components and in particular those used in aircraft includes a movable, gantry-type frame assembly having a movable robotic arm attached thereto. A drum assembly, attached to the robotic arm has one or more vacuum ports disposed along the surface of the drum. When vacuum from within the drum is applied to the ports and the drum is moved to contact flexible fabric material—such as the reinforcement fabric used for composite manufacture—an end of the fabric may be picked up through the effect of the applied vacuum and the fabric rolled-up around the drum. The movable gantry and/or the robotic arm may then move the drum to a desired location where the fabric is unrolled and prepared for composite manufacture. Variations to the vacuum ports permit the rolling and transport of a variety of materials and shapes.

22 Claims, 6 Drawing Sheets

FABRIC HANDLING APPARATUS AND METHOD FOR COMPOSITE MANUFACTURE

FIELD OF THE INVENTION

Background of the Invention

From the World War II image of "Rosie the Riveter" bolting together war planes to the jets flying overhead today, metal airplanes—and in particular aluminum airplanes—have always been associated with strength and reliability. Notwithstanding, aircraft designers today are turning to composite materials to meet the growing challenge(s) of maintaining safety and economy for air travelers.

Composites are the most important materials to be adapted for aviation since the use of aluminum in the 1920s. Composites are materials that are combinations of two or more organic or inorganic components. In a typical aircraft composite, one material serves as a matrix or binder, i.e., a material that holds everything together, while another material serves as a reinforcement, i.e., fibers or filaments or fabrics thereof embedded in the matrix. Until recently, the most common matrix materials were "thermosetting" materials such as epoxy, bismaleimide, or polyimide. The reinforcing materials are oftentimes glass fiber, boron fiber, carbon fiber, or other, more exotic materials such as Kevlar®. When employed in composite compositions, the reinforcing materials are imbedded in the matrix at specified angles in successive layers. As a result, composites so constructed can exhibit very high strength and stiffness characteristics.

Importantly, by combining two or more distinct, structurally complementary substances to form a composite material, the composite combination produces structural or functional properties not generally present in any one individual component. In simple terms, a composite structure typically exhibits more desirable characteristics—i.e., strength, weight, stiffness—than the individual components that make up the structure itself.

The importance of composites to the design of aircraft cannot be overstated. Weight reduction has been a critical goal of aircraft construction since the earliest days of flight. Following initial applications of wood, fabric, and wire for structural components, the aircraft industry made a major transition to aluminum and all-metal aircraft. As a result of this approach to aircraft design, modern aircraft exhibit a greatly reduced aircraft operating empty weight thereby realizing a significant payload to weight fraction that contributes directly to aircraft flight efficiency.

In the continual quest for reduced weight, performance and safety, aircraft manufacturers have introduced nonmetallic materials, such as fiberglass—reinforced plastic composites into aircraft structures. For example, composite sandwich parts have been used with great success on aircraft such as the Boeing 727 and its successors. The construction technique(s) used for early aircraft composites generally consisted of tailoring a reinforcement fabric to the required shape, pouring liquid resin onto the fabric, spreading and sweeping the resin to impregnate the fabric, vacuum bagging the part and tool, and curing in an oven or autoclave. Needless to say, this wet-layup method was very labor intensive and somewhat vulnerable to variation(s) from part to part.

Subsequent development of composite materials have led to significant advances in secondary aircraft components and structures, such as wing control surfaces, wing trailing and leading edges, vertical fin and stabilizer control surfaces, and landing gear doors. Weight savings in aircraft result because of the high strength-to-weight and stiffness-to-weight properties of the new composite materials. In addition, cost is reduced because a fewer number of pieces are required to construct various components. Lastly, structural integrity and safety are enhanced as a fewer number of fasteners are required for assembling aircraft employing composite structures.

As a final note, for many years, aircraft designers have been able to propose theoretical aircraft designs that they could not build because the materials needed to construct them did not exist. For instance, large spaceplanes like the Space Shuttle would have proven extremely difficult, if not impossible, to build without heat-resistant ceramic tiles to protect them during reentry. Additionally, high-speed forward-swept-wing airplanes simply would not have been possible without the development of composite materials to keep their wings from bending out of shape. Consequently, in addition to the added benefits for existing aircraft construction described above, composite materials permit the construction of entirely new types of aircraft.

Yet despite the significant advances in composite materials and aircraft structures constructed therefrom, the cutting, moving, positioning and laying up of the reinforcement fabrics used in the composites are still performed manually and are quite labor intensive. In particular, fabric plies are typically picked-up by hand, and transported manually to a lay-up/moldtable where they are subsequently manually positioned/repositioned. As used in the manufacture of aircraft composites, fabric plies may be quite large and require multiple persons to manually move—thereby exposing both the persons and fabric to injury and/or damage in addition to introducing variations in the finished composite product(s).

Consequently, methods and apparatus directed to the construction of composite materials—and in particular those which facilitate the handling of reinforcement fabric used in the manufacture composite aircraft components would represent a significant advance in the art. Such a method and apparatus is the subject of the instant invention.

SUMMARY OF THE INVENTION

We have developed, in accordance with the principles of the invention, an apparatus and accompanying method for handling fabrics used in the construction of composite materials and in particular those used in the construction of composite aircraft components.

Viewed from a first aspect, our inventive apparatus includes a movable, gantry-type frame assembly having a movable robotic arm attached thereto. A drum assembly, attached to the robotic arm has one or more vacuum ports disposed along the surface of the drum. When vacuum from within the drum is applied to the ports and the drum is moved to contact flexible fabric material—such as the reinforcement fabric used for composite manufacture—an end of the fabric may be picked up through the effect of the applied vacuum and the fabric rolled-up around the drum. The movable gantry and/or the robotic arm may then move the drum to a desired location where the fabric is unrolled and prepared for composite manufacture. Variations to the vacuum ports permit the rolling and transport of a variety of materials and shapes.

Viewed from another aspect—and according to our inventive method—a length of reinforcement fabric, including a number of individual reinforcement filaments, is initially cut and/or shaped as desired. An end of the fabric is secured to the surface of a take-up drum through the effect of a vacuum, and the remaining length of the fabric is circumferentially rolled up around the drum. The entire drum/fabric roll is then moved and/or repositioned over/onto/into a lay-up/mold configuration where it is substantially unrolled, aligned, and released from the drum. This process is repeated until all additional layer(s) of fabric/filaments are added.

The moved fabric is impregnated with matrix/resin and treated such that the fabric is permanently fixed, thereby creating the composite structure. Advantageously, our inventive apparatus and method may operate with a variety of fabrics/filaments/matrix materials as necessary.

These and other features and advantages of the present invention will become apparent with reference to the attached drawing and detailed description.

BRIEF DESCRIPTION OF THE DRAWING

A more complete understanding of the present invention may be realized by reference to the accompanying drawing in which:

FIG. 2(d) is a diagram of another alternative embodiment of a vacuum take-up drum according to the present invention.

DETAILED DESCRIPTION

Recall for a moment that present-day composite materials used in aircraft construction comprise a matrix and reinforcement filaments or fabrics embedded therein. The structural strength and characteristics of the finished composite is dependent upon the filament strength, matrix or resin strength and filament (fiber) orientation. Of critical importance to the characteristics of the finished composite is the structural integrity of the filaments and their indexing or orientation and sequencing of layers. Consequently, composite manufacturing methods and apparatus must not break or otherwise damage the filaments while ensuring their proper orientation(s). Advantageously, our inventive method and apparatus provides such operational characteristics.

Figure 1:
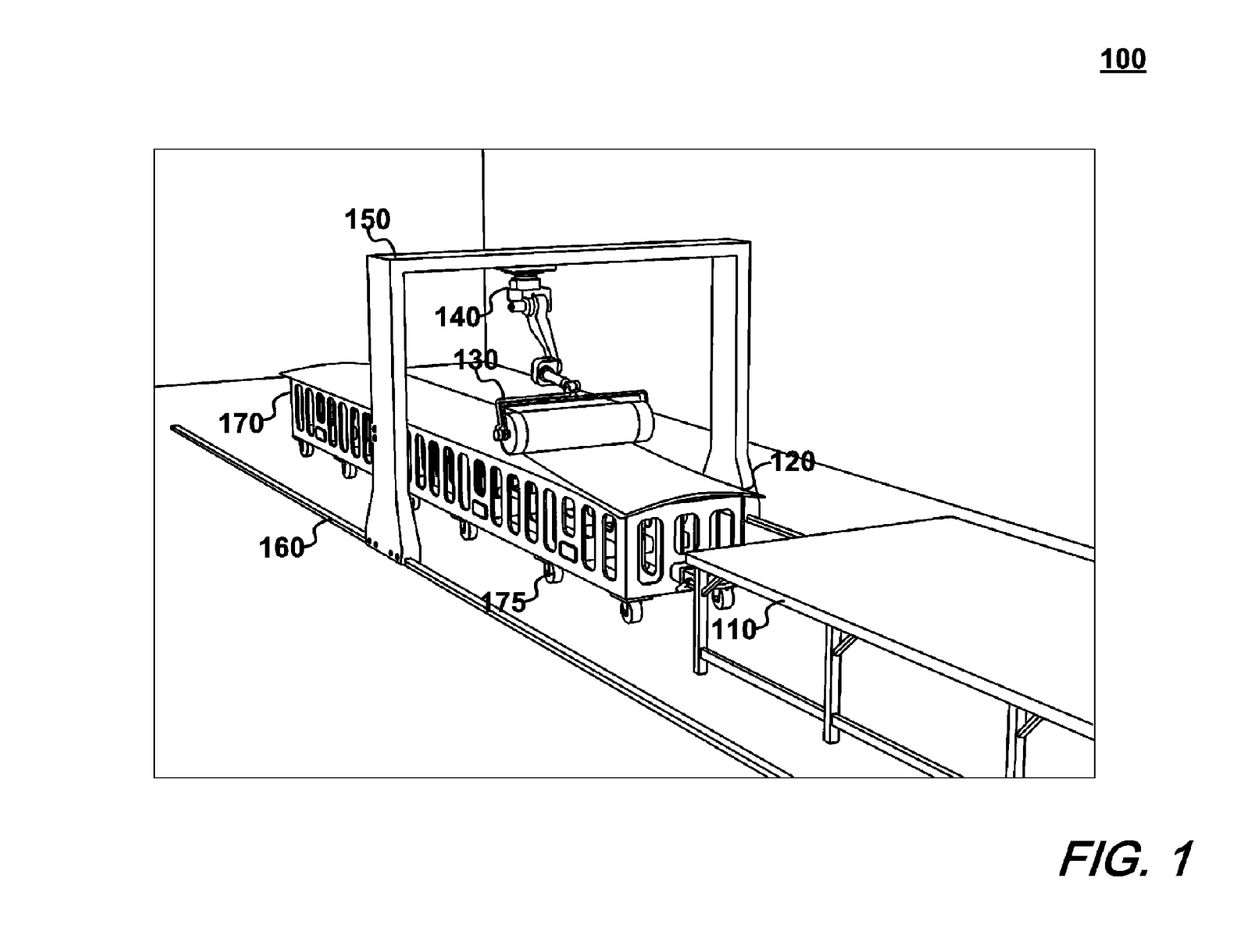
FIG. 1 is a diagram of a cutting/handling/lay-up/mold apparatus according to the present invention.

FIG. 1 shows a representative cutting/handling/lay-up molding apparatus for the preparation of composite materials according to the present invention. With reference to that FIG. 1, shown therein is a cutting table 110 on which a reinforcement fabric 120 may be placed, measured and subsequently cut as required.

According to our inventive teachings, after the reinforcement fabric 120 is laid-out, and/or measured and/or cut as required, it is subsequently rolled-up onto vacuum take-up drum 130, which in a preferred embodiment, may be attached to a robotic arm 140 which in turn may be part of a larger, gantry-frame robotic assembly 150.

As shown in FIG. 1, the gantry-frame robotic assembly 150 may itself be movable, for example, on railroad-type tracks 160. As a result, reinforcement fabric 120 prepared on the cutting table 110 may be rolled-up onto the vacuum take-up drum 130 and subsequently moved—along with the gantry-frame robotic assembly 150—over a lay-up or mold tool/table 170 onto/into which the reinforcement fabric 120 may be unrolled and oriented for composite fabrication. For even further movement flexibility, the mold tool/table may itself be movable for example positioned on casters 175 or another track-like configuration (not specifically shown).

Figure 2A:
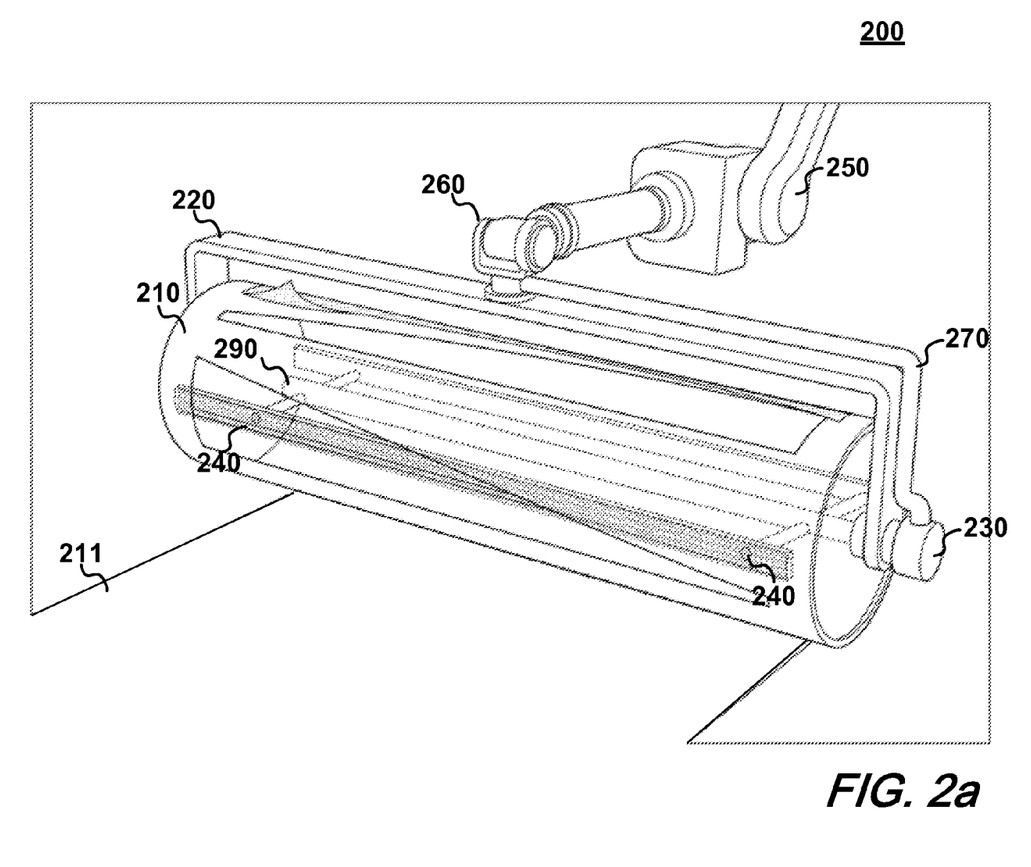
FIGS. 2(a) and 2(d) are a diagram of an exemplary vacuum take-up drum according to the present invention.

The details of our vacuum take-up drum operation may be understood by examination of FIG. 2(a). With reference to that FIG. 2(a), shown therein is the vacuum take-up drum 210 rotatably attached to take-up drum frame 220 by axle/bearing 230. This frame/drum assembly is in turn is attached to robotic arm 250 preferably by a swivel-able/rotate-able coupling 260. As can be readily appreciated by those skilled in the art, such an arrangement permits the drum 210 to freely rotate about the axle/bearing 230 and the entire drum frame 220 may likewise be movable in a substantially unlimited number of positions through the movement(s) of the robotic arm 250, and the coupling 260.

The vacuum take-up drum 210 shown in FIG. 2(a) has disposed along its length a series of vacuum ports 240 which provide a source of vacuum to the surface of the take-up drum 210. While only two such ports 240 are shown in FIG. 2(a), vacuum take-up drum(s) having a different number of ports in different configurations are a further advantage of our inventive teachings.

The vacuum supplied to the vacuum ports 240 may be supplied via vacuum supply tube 270, which may advantageously be routed and secured along the take-up drum frame 220. And while we have shown this vacuum supply tube 270 to be a rigid tube, it may in fact be a flexible supply tube, as needs and/or conditions require.

The vacuum is supplied to the vacuum ports 240 by vacuum distribution tube 290 positioned within the take-up drum 210 and which in a preferred embodiment may be rotated independent of the vacuum take-up drum 210. As we shall later show, the ability to rotate the vacuum distribution tube 290 and the vacuum ports 240 independently of the drum, permits further advantageous fabric handling characteristics of our invention.

With these structural relationships understood, the operation of the take-up drum assembly 200 may now be explained in the context of composite manufacture. More specifically, the vacuum take-up drum 210 is positioned onto a reinforcement fabric 211 that is laid out on a cutting table such that the vacuum from the vacuum port(s) 240 engage the fabric. When the drum 210 is so positioned at an end of the fabric 211, the vacuum from the vacuum ports 240 cause the end of the fabric to become secured (attached) to the drum 210. When the vacuum is so applied and the drum 210 is rolled, the fabric 211 is rolled up around the drum 210. Through the effect of the robotic arm 250 (and, preferably gantry frame robotic assembly—not shown in this FIG. 2(a)), the entire rolled fabric may be moved into another position—for example into a mold—where it may be unrolled into proper position and processed into a composite component.

It should be noted at this point that different sized drums (i.e., length, circumference, etc) are possible with our inventive method and apparatus. Those skilled in the art will quickly appreciate that such interchangeable drums only enhance the applicability of our invention to a wider variety of applications and fabrics. Where appropriate "wrist" couplings 260 are employed, the entire take-up drum/take-up drum frame may be attachably/detachably changed while maintaining any required electrical/electronic/vacuum connections as well.

As can now be readily appreciated, a number of variations to the assembly vacuum take-up drum assembly 200 shown in FIG. 2(a) are possible. For example, we have shown in FIG. 2(a) only a pair of vacuum ports 240. It is understood that variations in the application of vacuum are possible i.e., by a different number or configuration of vacuum ports or by vacuum apertures, that may run along the length of the vacuum take-up drum 210. For particular fabrics, it may even be desirable to have apertures along selective portions or the entire surface of the take-up drum 210 or large portions of the drum perforated, such that large portions of the drum effectively operate as vacuum ports.

Figure 2B:
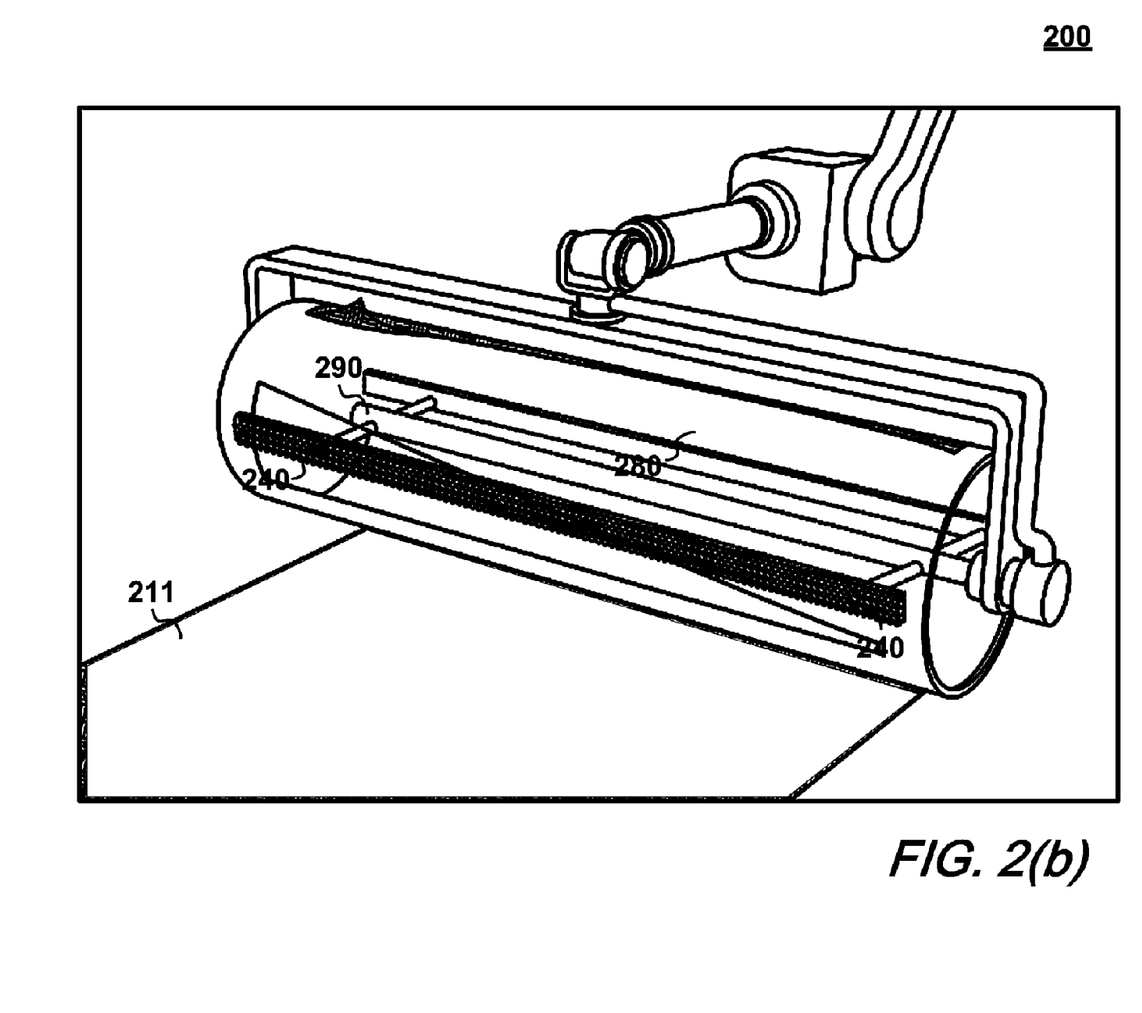
FIG. 2(b) is a diagram of an alternative embodiment of a vacuum take-up drum according to the present invention.

Such variations are shown in FIG. 2(b). In particular, and shown in that FIG. 2(b) is a substantially triangular-shaped vacuum aperture 280 running lengthwise along the vacuum take-up drum. As can be further seen from FIG. 2(b), the vacuum ports 240 are shown positioned such that one of the ports is within the aperture 280, while the other port is not. This positioning results from the vacuum distribution tube 290 and ports being movable, independently of the drum. Accordingly, once the ports are located within a desired position relative to the drum and any apertures, they may be maintained and/or secured in that position for operation.

When the vacuum ports 240 are positioned over an aperture in a manner such as that shown in FIG. 2(b), vacuum will be applied unevenly, or asymmetrically along the length of the take-up drum. Consequently, when the vacuum is applied to the port(s) and the drum is placed on a reinforcement fabric, the port within the aperture will have a greater affinity for the fabric. As a result, the fabric will be initially rolled up onto the drum on that portion of the drum with exposed vacuum ports. Advantageously, fabrics that may exhibit unusual shapes or be particularly difficult to handle, may become manageable with our inventive structure(s).

Figure 2C:
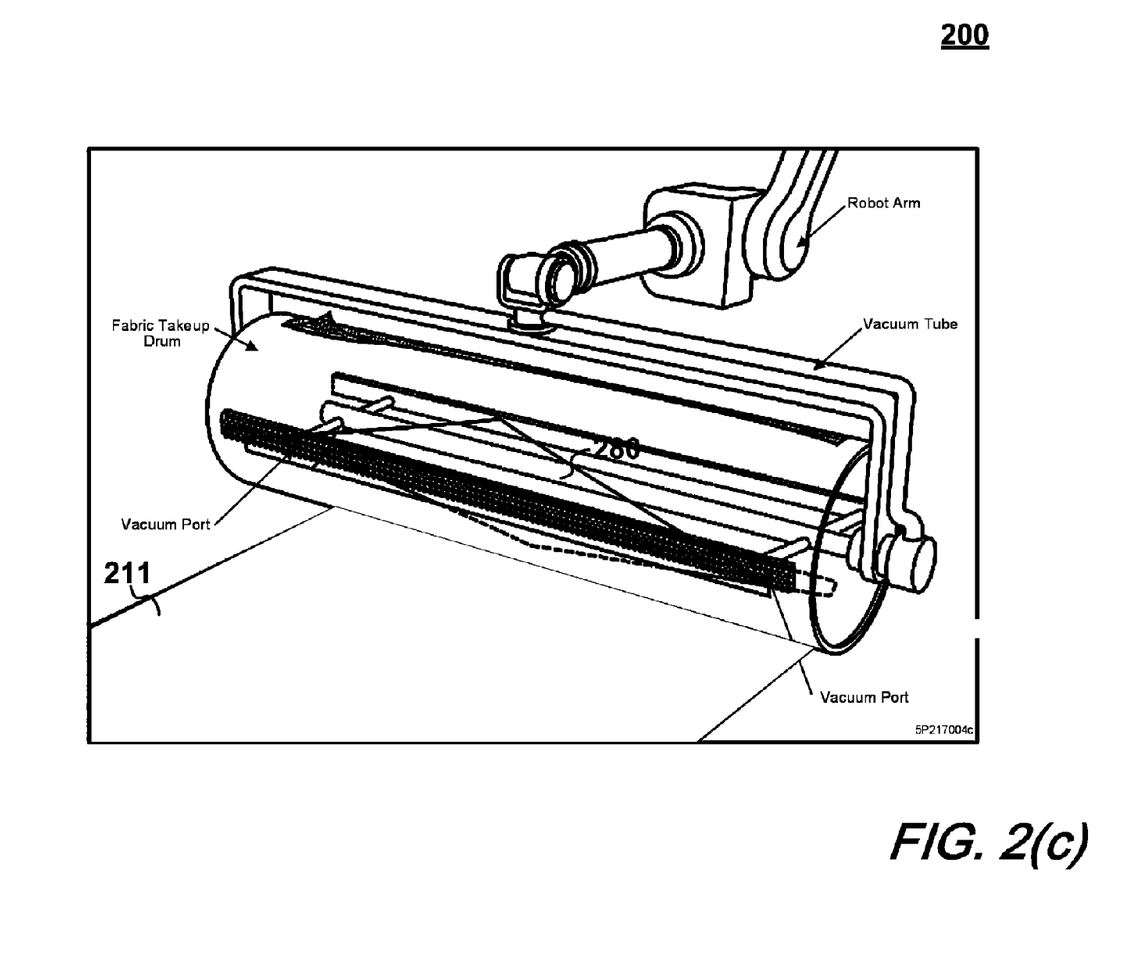
FIG. 2(c) is a diagram of another alternative embodiment of a vacuum take-up drum according to the present invention.

A further embodiment of this inventive principle is shown in FIG. 2(c). Shown in that FIG. 2(c) is a vacuum aperture 280 that is substantially triangular in shape. As should now be apparent, variations to, for example, the number, shape, or position of the vacuum ports and any vacuum apertures, is quite flexible. Consequently our inventive structures and method(s) are able accommodate a variety of fabrics and manufacturing requirements.

Figure 2D:
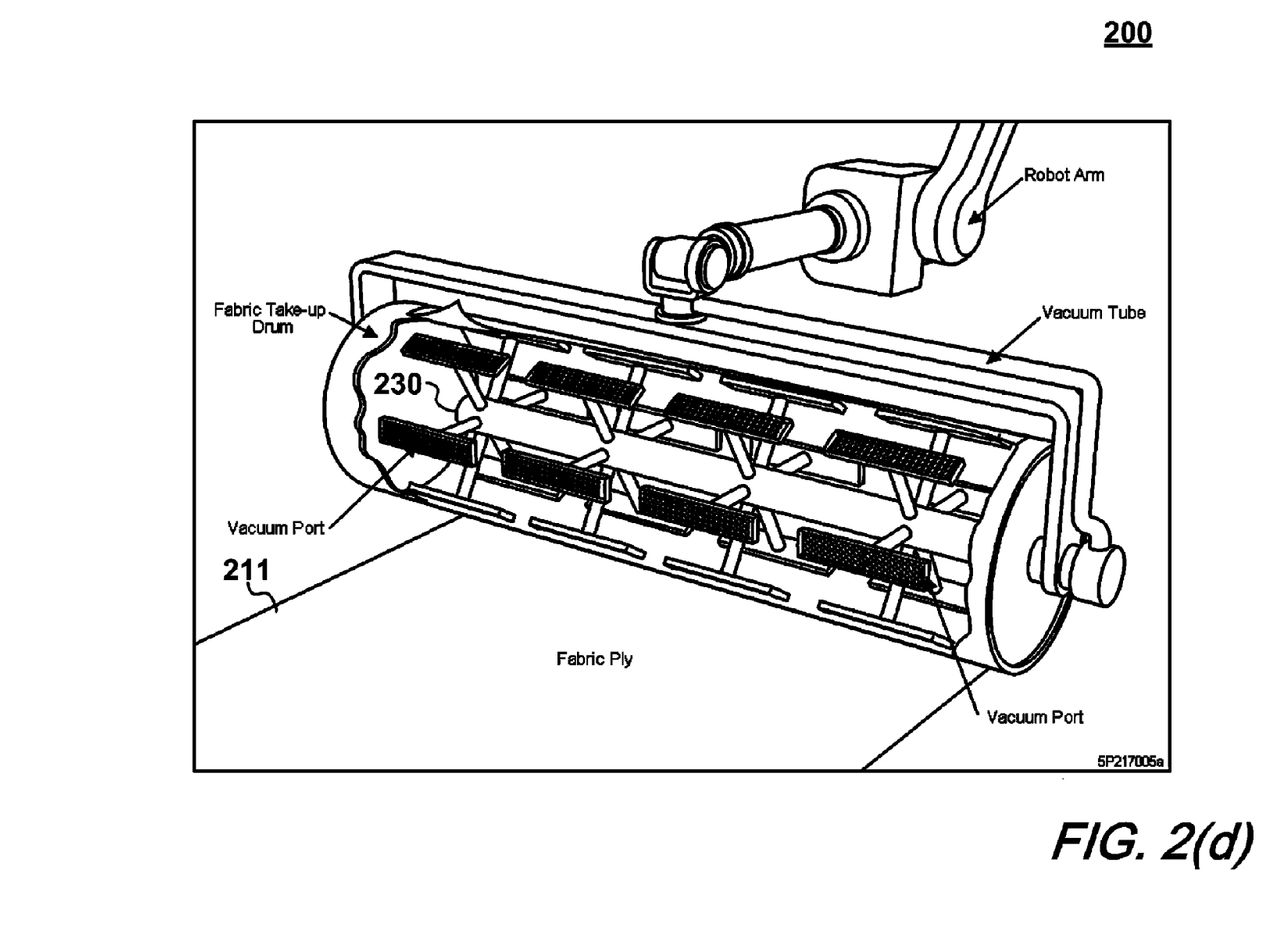

A further embodiment of this inventive principle is shown in FIG. 2(d). Shown in FIG. 2(d) is vacuum distribution tube 230 with multiple vacuum port locations. As should now be apparent, variations to, for example, the number, shape, or position of the vacuum ports and any vacuum apertures, is quite flexible. Consequently, our inventive structures and method(s) are able to accommodate a variety of fabrics and manufacturing requirements.

As is known by those skilled in the art, a length of fabric used to fabricate large aircraft composite components may be quite long and heavy. In addition, and as it was noted earlier, it is critically important to maintain proper directional orientation of individual filaments/fibers comprising the fabric as well insuring that the fabric is not torn, broken or otherwise damaged during handling. Advantageously, our inventive method and apparatus provides such handling capabilities to the manufacture of composite materials.

Figure 3:
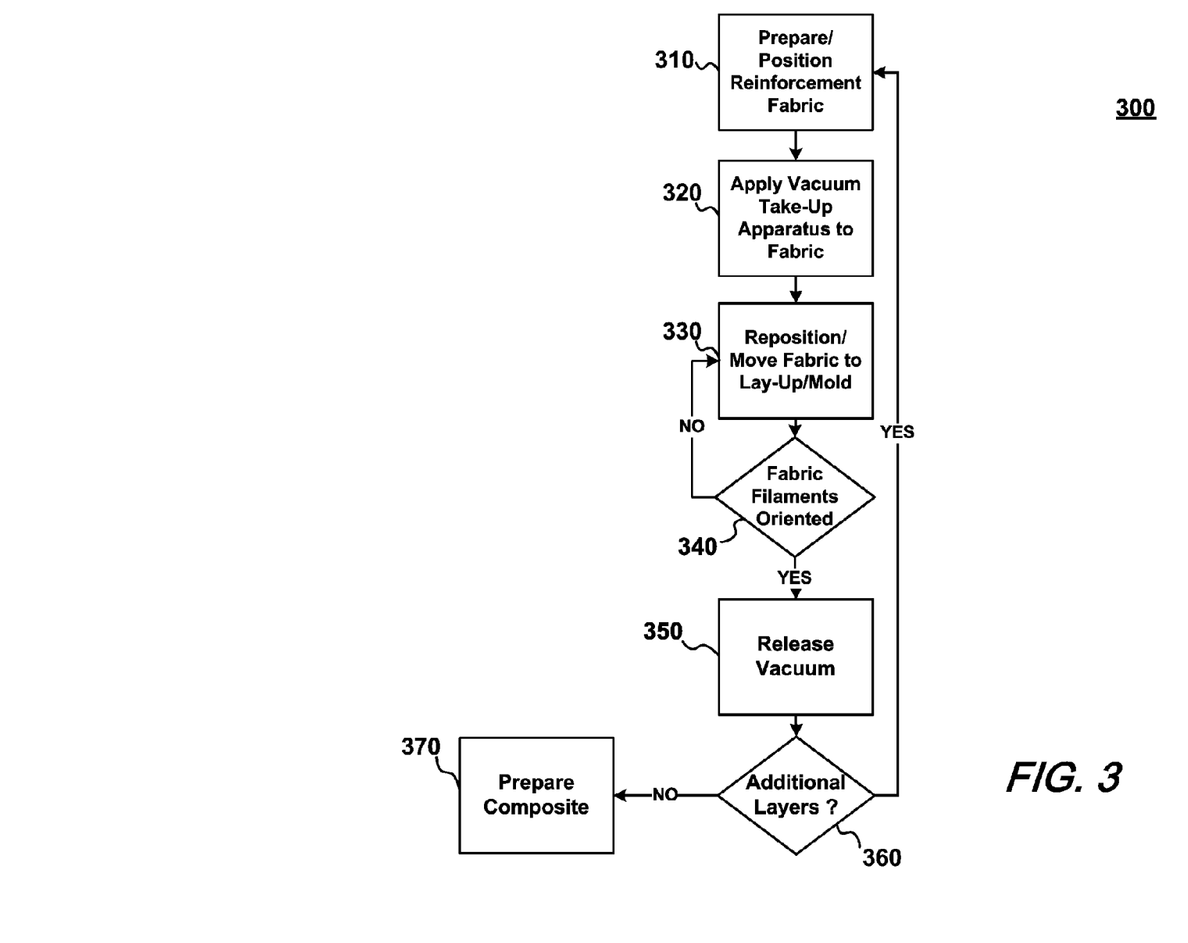
FIG. 3 is a flow chart depicting the method of the present invention.

To more completely understand our inventive method we turn now to FIG. 3 which shows a flowchart outlining the steps involved in our method. For assistance in understanding the discussion that follows, simultaneous reference to FIG. 3 and FIG. 1 is suggested.

As is known, the composite manufacturing process begins with a length of reinforcement fabric 120 positioned upon a cutting or other preparation table 110 on which the fabric is prepared. (Block 310—FIG. 3.) Once the fabric is shaped and oriented correctly, the vacuum take-up drum 130 is positioned at an end of the fabric and vacuum applied to the fabric through the vacuum ports or aperture(s) as required. (Block 320—FIG. 3.)

While a small piece of fabric may be lifted directly, one of significant length is preferably rolled onto the vacuum take-up drum 130 as the drum is rotated along the surface of the table 110. In those situations where greater vacuum port—fabric attraction is necessary, "backer blocks" or other like-devices may be placed on the fabric over the vacuum-ports prior to rolling.

At this point, those skilled in the art will of course realize that the fabric is rolled onto the drum in the reverse order from which it will be removed. That is, the first section or end of the fabric rolled onto the take-up drum will be the last to be unrolled.

Once secured and/or rolled upon the drum 130, the entire drum/fabric roll may be repositioned over a lay-up table/mold 170. (Block 330—FIG. 3). As can be recalled by inspection of FIG. 1, the roll of fabric may be repositioned through the movement of the robotic arm 140, the gantry frame assembly 150 and the layup/mold table 170 or a combination thereof.

After moving, and while the roll of fabric is unrolled, it is simultaneously positioned on/in the lay-up/mold. The positioning/repositioning is performed while ensuring that the fabric filaments are oriented correctly to produce the desired physical characteristics in the finished composite component(s). In a simple lay-up operation, the fabric may have matrix or resin material applied by hand, by machine, or through the effect of a vacuum molding/impregnating operation which is generally known in the art.

A further aspect of our inventive operation is that the fabric may remain vacuum-engaged to the vacuum take-up drum 130 until it is positioned correctly. In this manner, it may be repositioned and/or placed under tension prior to removing the vacuum from the vacuum ports securing the fabric to the drum. As a result, the orientation of the individual fabric filaments may be positively determined, prior to securing them through the effect of the matrix/resin. Additionally, and as may be required and/or desired for certain filament/matrix/composite compositions and applications, it is possible to "pre-strees" and/or apply a tensile tension to the filaments prior to the application of the matrix. This orientation/repositioning/reorientation step(s) are represented by blocks 340 and 330 of FIG. 3.

Once the fabric is positioned in its desired position and fibers aligned as desired and/or tension applied, the vacuum may be released and further layers (if necessary) applied to the prior layer(s). (Block 360—FIG. 3) Of course, with our inventive method and apparatus, any subsequent/additional layers of fabric are also individually oriented/positioned/reoriented such that they lie in a desired orientation as well.

Once all of the individual fabrics/layers are placed, the finished composite material may be prepared through a series of lay-up and/or molding operations involving the fabric(s) and any matrix/resins (Block 370—FIG. 3).

At this point, while we have discussed and described our invention using some specific examples, those skilled in the art will recognize that my teachings are not so limited. More specifically, it is understood that a variety of reinforcement fabrics/filaments are usable with our inventive teachings. Additionally, virtually any matrix/binder materials may be used so long as they are compatible with any chosen fabric/filament. Finally, our inventive method and apparatus may be used with manual lay-up schemes as well as vacuum molding type schemes, wherein the resulting product of the scheme is a composite It is understood that additional . Accordingly, my invention should be only limited by the scope of the claims attached hereto.

What is claimed is:

1. A fabric handling method for the manufacture of composite materials, said method comprising the steps of:
    positioning one or more vacuum apertures disposed along a surface of a single rotatable take-up drum over the fabric;
    aligning one or more vacuum ports with the one or more apertures, wherein the aligning includes the step of rotating the vacuum ports directionally-independent relative to the take-up drum;
    initiating a vacuum at a portion of the surface of the take-up drum aligned with the ports;
    securing, through the effect of the vacuum, one end of a length of composite reinforcement fabric to the take-up drum;
    rolling the length of composite reinforcement fabric circumferentially around the take-up drum; and
    moving the drum and the fabric to a desired location;
    unrolling the length of fabric in a desired orientation; and
    releasing the fabric from the take-up drum.

2. The method of claim 1 wherein said unrolling step further comprising the steps of:
    orienting the filaments comprising the fabric to a desired orientation.

3. The method of claim 2 wherein said unrolling step further comprises the steps of:
    introducing a tensile tension in selected filaments comprising the fabric.

4. The method of claim 1 wherein said releasing step further comprises the steps of:
    terminating the vacuum initiated at the surface of the take-up drum.

5. The method according to claim 4 further comprising the steps of:
    adjusting the amount of vacuum at the surface of the take-up drum prior to releasing the fabric.

6. The method according to claim 1 further comprising the steps of:
    repeating, the above steps for all additional layer(s) of reinforcement fabric.

7. The method according to claim 6 further comprising the steps of:
    impregnating the reinforcement fabric with a suitable composite matrix material; and
    treating the matrix material such that it permanently bonds the reinforcement fabric in place.

8. The method of claim 1, wherein the securing is effected only at one end of the fabric.

9. The method of claim 1, wherein the circumference of the drum is less than the length of the composite reinforcement fabric to be rolled around the drum.

10. An apparatus for loading, unloading, and moving fabric material from one location to another, said apparatus comprising:
    a movable structural frame;
    a movable appendage, attached to the frame;
    a single rotatable drum attached to the appendage;
    said rotatable drum having one or more vacuum apertures, disposed along an outer surface of the drum, thereby permitting the free-flow of air from inside the drum; and
    one or more vacuum ports disposed within the drum and connected to a vacuum distribution tube, wherein the one or more ports are rotatable directionally-independent of the drum.

11. The apparatus of claim 10, wherein the number of apertures is sufficient for providing a vacuum to the outer surface of the drum, such that only one end of the fabric material is secured to the outer surface of the drum.

12. The apparatus of claim 10, wherein said one or more ports comprise a plurality of holes (passageways).

13. The apparatus of claim 10 wherein said movable structural frame comprises a gantry-frame robotic system.

14. The apparatus of claim 13 wherein said movable appendage comprises a robotic arm.

15. The apparatus of claim 14 wherein said robotic arm includes an attachable/detachable coupling for attaching/detaching the rotatable drum to the robotic arm.

16. The apparatus according to claim 10, wherein the circumference of the drum is less than the length of the fabric to be rolled around the drum.

17. A fabric handling apparatus for the manufacture of composite materials comprising:
    a single means for rolling the fabric, wherein the rolling means includes one or more apertures disposed along an exterior surface of the rolling means;
    a means for securing an end of the fabric to the rolling means wherein the securing is effected by a vacuum delivered to the exterior surface of the rolling means by a vacuum delivering means, wherein the vacuum delivering means is disposed within the rolling means and rotatable directionally-independent of the rolling means;
    a means for repositioning the rolling means; and
    a means for relocating the repositioning means.

18. The apparatus according to claim 17 wherein said rolling means is a drum, substantially cylindrical in shape.

19. The apparatus of claim 18, wherein the circumference of the drum is less than the length of the fabric to be rolled around the drum.

20. The apparatus according to claim 18 wherein said means for repositioning the rolling means is a robotic-arm.

21. The apparatus according to claim 20 wherein said means for relocating the repositioning means is a gantry-frame type robotic assembly.

22. The apparatus of claim 17, wherein the securing means secures only one end of the fabric.

* * * * *

UNITED STATES PATENT AND TRADEMARK OFFICE
CERTIFICATE OF CORRECTION

PATENT NO. : 7,601,237 B2
APPLICATION NO. : 11/307321
DATED : October 13, 2009
INVENTOR(S) : Burgess et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 265 days.

Signed and Sealed this

Fifth Day of October, 2010

David J. Kappos
*Director of the United States Patent and Trademark Office*